(12) United States Patent
Albrecht et al.

(10) Patent No.: US 7,011,490 B2
(45) Date of Patent: Mar. 14, 2006

(54) COMPRESSOR IN A MULTI-STAGE AXIAL FORM OF CONSTRUCTION

(75) Inventors: Guenter Albrecht, Feldgeding (DE); Klaus-Dieter Tartsch, Aichach (DE); Joseph Tomsik, Munich (DE); Bernhard Woehrl, Gauting (DE)

(73) Assignee: MTU Aero Engines GmbH, Munich (DE)

( * ) Notice: Subject to any disclaimer, the term of this patent is extended or adjusted under 35 U.S.C. 154(b) by 346 days.

(21) Appl. No.: 10/423,744

(22) Filed: Apr. 25, 2003

(65) Prior Publication Data

US 2003/0233822 A1 Dec. 25, 2003

(30) Foreign Application Priority Data

Apr. 25, 2002 (DE) ............... 102 18 459

(51) Int. Cl.
*F01D 21/00* (2006.01)
(52) U.S. Cl. ............... 415/9; 415/174.4; 60/39.091
(58) Field of Classification Search ............... 415/9, 415/229, 170.1, 174.1, 174.2, 174.4; 416/244 R; 60/39.091, 726, 223, 226.1
See application file for complete search history.

(56) References Cited

U.S. PATENT DOCUMENTS

| 3,515,501 A | 6/1970 | Palfreyman et al. | |
|---|---|---|---|
| 5,308,225 A * | 5/1994 | Koff et al. | 415/57.3 |
| 5,400,505 A * | 3/1995 | Wei et al. | 29/889.2 |
| 5,417,501 A | 5/1995 | Hyde et al. | |
| 5,733,050 A | 3/1998 | Diepolder et al. | |
| 6,009,701 A | 1/2000 | Freeman et al. | |
| 6,082,959 A * | 7/2000 | Van Duyn | 415/9 |
| 6,240,719 B1 | 6/2001 | Vondrell et al. | |

FOREIGN PATENT DOCUMENTS

| CH | 497 641 | 11/1970 |
|---|---|---|
| DE | 44 29 640 | 4/1995 |
| DE | 196 05 971 | 8/1997 |
| DE | 10163951 C1 * | 12/2002 |

OTHER PUBLICATIONS

O.E. Kosing, et al., "Design Improvements of the EJ 200 HP Compressor From Design Verification Engine to a Future All Blisk Version", Proceesings of ASME Turbo Expo 2001: Land, Sea and Air, Jun. 4-7, 2001, New Orleans, Louisiana.

* cited by examiner

*Primary Examiner*—Thomas E. Lazo
*Assistant Examiner*—Dwayne J White
(74) *Attorney, Agent, or Firm*—Kenyon & Kenyon

(57) ABSTRACT

A compressor in a multi-stage axial form of construction, with a rotor which is mounted overhung and includes a plurality of moving-blade rings on blade carriers connected to one another, and with a blade arrangement, in which the moving-blade ring of the first stage forms the blade cascade arranged furthest upstream. At least one of the rotating blade carriers is produced in an MMC form of construction, that is to say as a metal component fiber-reinforced at least in regions, and the rotary bearing absorbing the large part of the radial loads occurring on the rotor has a predetermined breaking point which, when a defined radial load is exceeded, allows a radial shift of the rotor, with the result that the latter brushes against the stator.

19 Claims, 2 Drawing Sheets

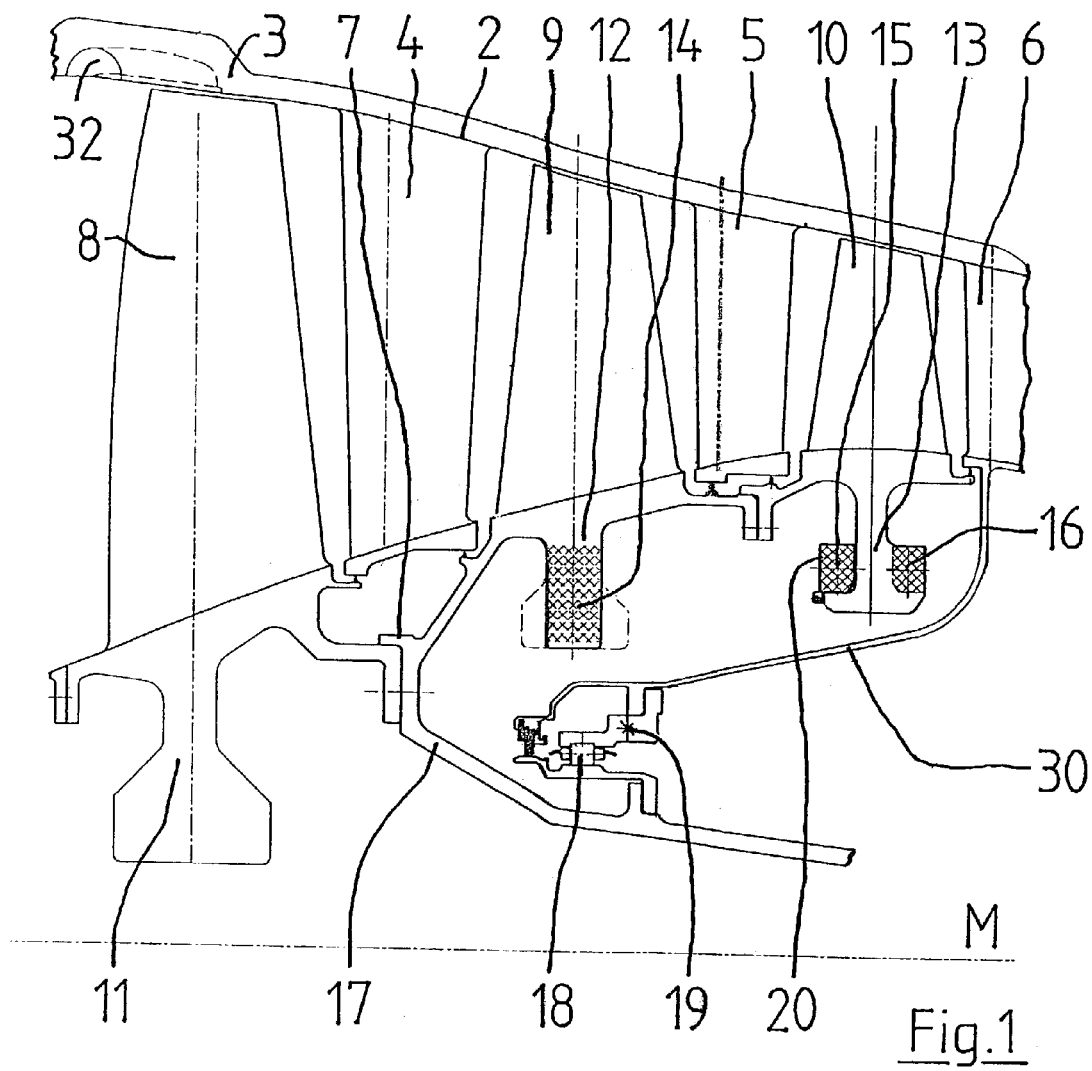
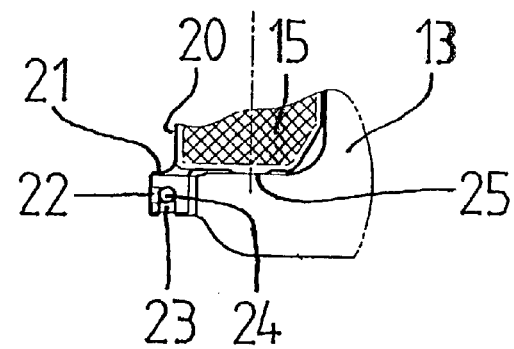
Fig.1
Fig.2

COMPRESSOR IN A MULTI-STAGE AXIAL FORM OF CONSTRUCTION

CROSS-REFERENCE TO RELATED APPLICATIONS

The present application claims priority to Application No. 102 18 459.3, filed in the Federal Republic of Germany on Apr. 25, 2002, which is expressly incorporated herein in its entirety by reference thereto.

1. Field of the Invention

The present invention relates to a compressor in a multi-stage axial form of construction with high fluidic efficiency.

2. Background Information

By virtue of the special overhung mounting of a low-pressure compressor rotor, it is possible, on the inlet side, to dispense with what is referred to as a bearing star, that is to say with a plurality of struts leading from the compressor casing radially to the rotor center and carrying the front shaft bearing. The blading is designed such that there is also no need for a static pre-guide cascade upstream of the first moving-blade ring. This design may make it possible to optimize the fluidic efficiency and, moreover, may improve bird impact resistance, since rotating blade rings very quickly fragment an impinging foreign body in the manner of a multiplicity of knife edges and consequently distribute the impact energy.

With a view to fluidic optimization, in the case of a predetermined pressure ratio, the number of stages, that is to say the number of moving-blade and guide-vane rings, is minimized, that is to say the compressor is operated with a high stage load. Since increases in rotational speed are usually possible only to a very limited extent for mechanical and other reasons, a high compressor throughput may require correspondingly large duct cross-sections and therefore relatively long and heavy moving blades and guide vanes. Heavy moving blades may require particularly stable and therefore likewise heavy blade carriers. Where only annular blade carriers with a small radial cross-sectional height are possible for reasons of space, these have to be thickened disproportionately in the axial direction, thus leading to considerable additional weight. Despite the use of titanium alloys with a favorable strength/weight ratio for moving blades and rotating blade carriers, the ultimate result is a relatively heavy rotor. In terms of mechanical engineering, heavy rotors may be mounted on both sides, that is to say are arranged between two rotary bearings. For the abovementioned reasons, however, an overhung mounting at a "free" shaft end may be selected, which may lead to serious problems in the event of damage. If, for example, a pronounced rotor unbalance occurs as a result of a blade break or blade loss, such high radial loads may be transmitted to the stator via the adjacent rotary bearing that the engine suspension breaks, with potentially catastrophic consequences for the aircraft.

In view of these problems, it is an object of the present invention to provide a compressor arrangement with an overhung rotor mounting, which, along with high operating liability, may make it possible to reduce the rotor weight.

SUMMARY

The above and other beneficial objects of the present invention may be achieved by providing a compressor as described herein.

In accordance with an example embodiment of the present invention, it may be provided to produce at least one of the blade carriers in the MMC form of construction (Metal Matrix Composites), in order, for the same strength, to reduce the weight, as compared with straightforward metal versions. This may provide a particularly pronounced effect where only annular blade carriers with a small radial cross-sectional height are possible for reasons of space. In combination with this weight-saving MMC technique, it may be possible to provide the rotary bearing supporting the rotor-carrying shaft end with a predetermined breaking point which releases the rotor radially to a limited extent when the defined radial load is exceeded, so that, by the rotor brushing against the stator, along with high friction, wear and deformation, the rotational energy and unbalance of the rotor, already lower due to the weight reduction, may be very quickly broken down potentially to "zero". An overloading of the compressor suspension or engine suspension may thereby be reliably avoided. The ultimately necessary switch-off/shutdown of the compressor or engine may be relatively acceptable by comparison.

Example embodiments of the compressor according to the present invention are described below.

This present invention is explained in more detail hereafter with reference to the drawings in which, in a simplified illustration which is not to scale.

BRIEF DESCRIPTION OF THE DRAWINGS

FIG. 1 is a longitudinal half-sectional view through a three-stage compressor in an axial form of construction.

FIG. 2 is a part-sectional view through a blade carrier with fiber reinforcement on a scale which is enlarged in relation to FIG. 1.

DETAILED DESCRIPTION

Figure 4:
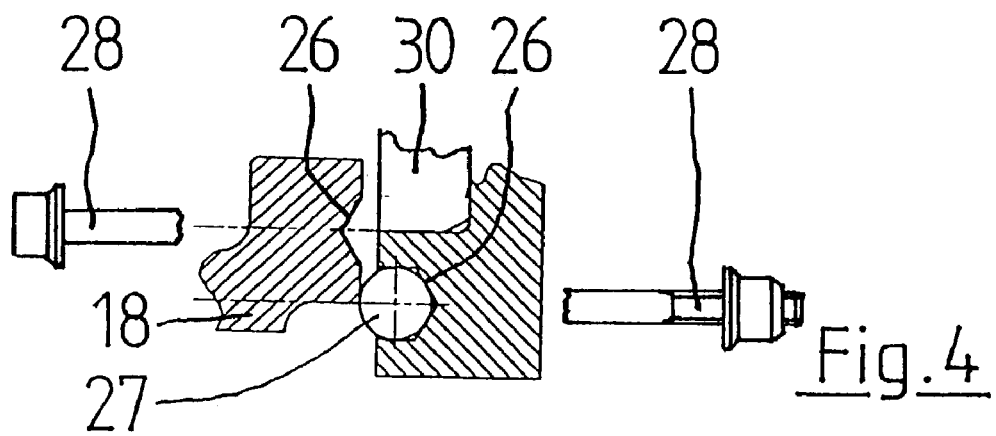
FIG. 4 is a part-sectional view comparable to FIG. 3 and covering a larger region, after the triggering of the predetermined breaking point.

The stator 2 of the three-stage compressor 1 illustrated in FIG. 1 has an outer, at least largely rotationally symmetrical casing 3 and three guide-vane rings 4, 5 and 6. The rotor 7 possesses correspondingly three moving-blade rings 8, 9 and 10 on annular or disc-shaped blade carriers 11, 12 and 13. The moving-blade ring 8 forms the blade cascade located furthest upstream, and the direction of flow in the compressor 1 accordingly extends from left to right. The rotor 7 having the components 8 to 10 and 11 to 13 is mounted overhung, that is to say is connected to a shaft end 17 projecting beyond a rotary bearing 18. According to the illustration, the shaft end 17 and the blade carrier 12 form an integral unit, but they may be screwed to one another. The rotary bearing 18 is arranged as a radial bearing/loose bearing, actually, as a cylindrical roller bearing. The fixed bearing conventionally co-operating with the loose bearing and located further downstream/to the-right is not illustrated in detail. The rotary bearing 18 is connected on the stator side to a frustoconical carrier 30 which widens in the downstream direction and which, in turn, is firmly connected to the rearmost guide-vane ring 6. This results in a relatively rigid connection of the rotary bearing 18 to the casing 3 of the compressor 1. The rotary bearing 18, by being arranged near to or at the center of gravity of the rotor 7, absorbs virtually the entire radial loads acting on the latter. In the event of pronounced rotor unbalances, these may be transmitted to the casing 3 via the carrier 30 largely in their full intensity, with the risk that the suspension of an engine including the compressor may break. According to an example embodiment of the present invention, therefore, between the rotary bearing 18 and the carrier 30, a predetermined breaking point 19 is interposed, which releases the rotor 7 radially to a limited extent when a defined radial load is exceeded. By brushing against the stator 2, the rotor 7 is braked at least to an extent such that the unbalance may be reduced very quickly to an amount compatible with the suspension. The compressor, which may be very seriously damaged in this case, may, as a rule be shut down and the engine correspondingly switched off. This may nevertheless be a highly effective method of damage limitation and of an increase in safety.

The connection of the blades of the moving-blade rings 8 to 10 to their blade carriers 11 to 13 may be conventionally positive or integral, the tendency being somewhat toward integral blisk-and-bling versions, as illustrated in FIG. 1. The foremost blade carrier 11 forms, with its moving-blade ring 8, a metallic blisk (bladed disc) without fiber reinforcement. Since the radial extent of the blade-carrier cross-section may still be relatively large at this point, that is to say does not present any problems in terms of strength, an MMC form of construction may not afford any decisive advantages here. Moreover, at the front rotor end, it may be necessary to bear in mind the problems of bird impact or FOD (Foreign Object Damage) which may make it necessary to have a deformability of the components which is scarcely afforded in the case of MMC. The situation is different in the case of the blade carrier 12 which with its moving-blade ring 9 forms a bling (bladed ring) in an MMC form of construction. Owing to the arrangement radially outside the rotary bearing 18, the space conditions seriously restrict the radial cross-sectional height of the blade carrier 12, so that, here, an MMC form of construction raises the expectation of marked savings in terms of material and weight. The fiber-reinforced region 14 subjected to maximum mechanical load is illustrated by cross-hatching, and, in this case, the at least one "endless" reinforcing fiber is to be materially integrated in a wound arrangement into the matrix metal. For comparison, the blade-carrier contour which may be necessary, for example, without any fiber reinforcement is indicated by dashes and dots. In this MMC form of construction, the transitional region, under high tensile stresses, from the fiber-reinforced material to the non-fiber-reinforced material may be highly sensitive in manufacturing terms, and therefore two further MMC forms of construction are explained by the example of the blade carrier 13. Due to the conically widening carrier 30 of the rotary bearing 18, the space conditions in the case of the blade carrier 13 are confined in a similar manner to item 12, so that, here too, an MMC form of construction may provide advantages. With reference to the blade carrier 13, two different types of connection of fiber-reinforced regions are illustrated, but only one type is to be used for each blade carrier. The cross-section of the blade carrier 13 is prolonged in a hub-like manner in both axial directions in the region of its inside diameter. Fiber-reinforced regions 15 or 16 are seated in pairs, opposite one another, on these prolongations. The region 16, illustrated here only on the right, is to be integrated materially into the blade carrier 13. The region 15, illustrated here only on the left, is arranged as a separate ring 20 and is fixed frictionally and positively to the blade carrier 13. Both forms of the construction may provide the advantage in terms of strength that the annular MMC regions are placed under compressive stresses radially from inside via the hub-like prolongations of the blade carrier 13, so that there may be virtually no tendency to come loose from one another. The reinforcing fibers in the regions 15 and 16 are in this case placed largely "ideally" under tensile stresses, that is to say, are utilized optimally. In the case of the region 16, shearing stresses are additionally transmitted on one end face.

The connection of the separate ring 20 is illustrated once more, enlarged, in FIG. 2. The seat 25 which transmits compressive stress is produced as a defined press fit which is arithmetically already sufficient, in itself, to fix the ring 20 securely to the blade carrier 13 axially and tangentially. The contact surface on the ring 20 may in this case be of convex arrangement for the purpose of favorable stress distribution (Hertzian stress), and the contact surface on the blade carrier 13 is cylindrical. Positive fixing is added as an additional safeguard. For this purpose, the ring 20 is provided with extensions 21 which are distributed over its circumference and engage into corresponding recesses of the blade carrier 13. The extensions 21 include axially open grooves 22, and the blade carrier 13 includes radially inwardly open grooves 23, into which securing elements 24 in the form of rivets, studs, wires, etc. are inserted. Instead of the grooves, bores or ducts, which are more difficult to manufacture, may also be present. The positive connection acts both as additional axial securing and as additional rotation prevention. The form of construction with separate rings 20 in the MMC technique may provide that these are relatively simple to mount and exchange. Moreover, the rings 20 may be checked for defects more effectively than integral connections. It may be left open whether the unit consisting of the blade carrier 13 with fiber-reinforced regions located on both sides and of the moving-blade ring 10 is to be designated as a bling or as a blisk. The boundary between these two terms may not be defined exactly.

The moving-blade ring 8 of the first stage is combined on the casing side with what is referred to as casing treatment, that is to say with recirculation ducts 32, which is appropriate for improving the compressor stability. Such a measure may also be provided on other compressor stages.

Figure 3:
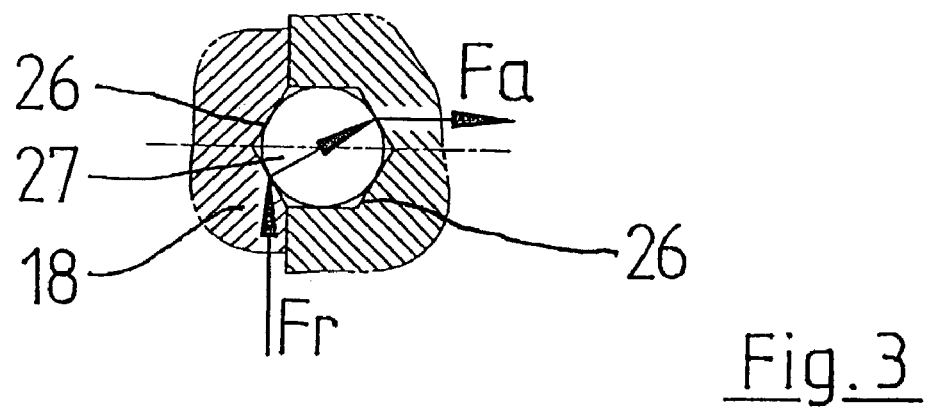
FIG. 3 is a part-sectional view through a ball guide for force deflection at a predetermined breaking point assigned to the rotary bearing.
Figure 5:
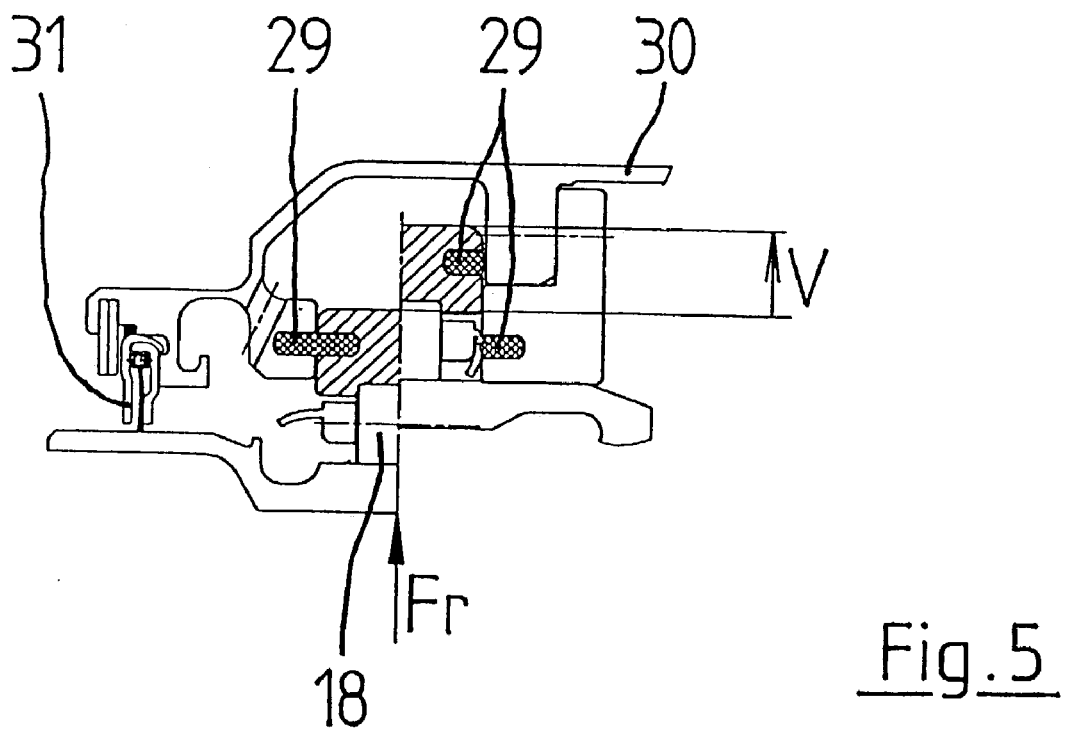
FIG. 5 is a part-sectional view through a rotary bearing with a further version of a predetermined breaking point, before and after triggering.

FIGS. 3 to 5 illustrate the aspect of overload protection by a predetermined breaking point 19 in the region of the rotary bearing 18. As illustrated in FIGS. 3 and 4, ball guides 26 are used, in order to deflect radial loads Fr, with reinforcement, into axial forces Fa. When defined axial forces are exceeded, axial tension bolts 28 break and release the rotary bearing 18 with the effect of a limited radial movability.

In this case, a plurality of ball guides 26 with balls 27 and a plurality of tension bolts 28 are arranged uniformly over the circumference of the rotary bearing 18 and of its carrier 30. In the example embodiment illustrated, the guide surfaces of the ball guides 26 are composed of conical and cylindrical surfaces which may be simple to manufacture. Force reinforcement occurs due to the cone angle. Other geometries, for example with spherical regions, may also be suitable. FIG. 4 illustrates the released state after the load has been exceeded, with broken tension bolts 28. It can be seen that the radial relative displacement (e.g., vertical) also results in a small axial relative displacement (e.g., horizontal) due to the emergence of the balls 27 from the conical surface.

FIG. 5 illustrates an alternative design principle for a predetermined breaking point 19. The rotary bearing 18 is provided axially on both sides, in the region of its static outer ring, with shearing rings 29 which engage positively into the outer ring of the rotary bearing 18 and into the carrier 30 or into elements connected to the latter. When a defined radial load Fr is exceeded, the shearing rings 29 break abruptly without any relevant plastic deformation. The materials considered for the shearing rings 29 are metallic materials, ceramic materials or plastics, etc., in each case with or without embedded additives, such as particles, fibers, etc. It may be provided, in this case, to have a breaking load which may be calculated and reproduced as accurately as possible. The released state with a broken shearing ring 29 and with a radial offset V is illustrated on the right of the axial center of the rotary bearing 18. It may also be noted, in addition, that the rotary bearing 18 is sealed off relative to the shaft by a brush seal 31 which has a relatively tolerant behavior with respect to radial shaft deflections.

It may be provided that versions of a predetermined breaking point which are other than those described here may also be used, without departing from the principle of the present invention. This is in the combination of a weight reduction of the rotor by the MMC technique with an increase in safety by a predetermined breaking point assigned to the rotary bearing.

What is claimed is:

1. A compressor in a multi-stage axial form of construction with a high fluidic efficiency, comprising:
   a rotor mounted overhung and including a plurality of moving-blade rings on at least one of disc-shaped and annular blade carriers connected to one another, at least one blade carrier produced in a metal matrix composite form of construction;
   a blade arrangement without a pre-guide cascade, a moving-blade ring of a first compressor stage forming a blade cascade arranged furthest upstream; and
   a rotary bearing arranged to absorb at least a majority of radial loads occurring on the rotor and including a predetermined breaking point configured to allow a limited radial shift of the rotor when a defined radial load is exceeded so that the rotor brushes against a stator of the compressor to reduce a rotational speed potentially to a standstill.

2. The compressor according to claim 1, wherein the compressor is arranged as a low-pressure compressor of an aircraft gas turbine.

3. The compressor according to claim 1, wherein the rotor is connected to a shaft end projecting from the rotary bearing.

4. The compressor according to claim 1, wherein the at least one blade carrier is produced as a metal component fiber-reinforced at least in regions.

5. The compressor according to claim 4, wherein the at least one blade carrier includes, in the fiber-reinforced region, a metallic matrix and at least one long fiber arranged in windings and including silicon carbide.

6. The compressor according to claim 5, wherein the metal matrix is arranged on a titanium base.

7. The compressor according to claim 1, wherein the at least one blade carrier is arranged as an annular component as a bling including a materially-integrated fiber-reinforced region.

8. The compressor according to claim 7, wherein the at least one blade carrier includes integral blading.

9. The compressor according to claim 1, wherein the at least one blade carrier is arranged as a disc-shaped component including two fiber-reinforced regions arranged symmetrically to an axial disc center, the two fiber-reinforced regions one of materially integrated and frictionally and positively fastened.

10. The compressor according to claim 9, wherein the disc-shaped component includes integral blading.

11. The compressor according to claim 9, wherein the disc-shaped component is arranged as a blisk.

12. The compressor according to claim 1, wherein the predetermined breaking point at the rotary bearing includes ball guides arranged to deflect radial loads, with reinforcement, into axial forces and tension bolts arranged to break when a defined axial force is exceeded.

13. The compressor according to claim 1, wherein the predetermined breaking point at the rotary bearing includes shearing rings arranged to break when a defined radial load is exceeded.

14. The compressor according to claim 1, wherein the rotary bearing includes a rolling bearing in a radial form of construction.

15. The compressor according to claim 1, wherein the rotary bearing includes a cylindrical roller bearing.

16. The compressor according to claim 1, wherein the rotary bearing is arranged on a frustoconical carrier that widens in a downstream direction and is connected downstream of the rotor to a stator of the compressor.

17. The compressor according to claim 1, wherein the rotary bearing includes a brush seal on at least one side.

18. The compressor according to claim 1, wherein at least one moving-blade ring of the rotor is combined fluidically with a casing treatment.

19. The compressor according to claim 1, wherein at least one moving-blade ring includes a plurality of casing-side recirculation ducts in a blade-tip region.

* * * * *